United States Patent [19]
Kimura

[11] Patent Number: 5,237,177
[45] Date of Patent: Aug. 17, 1993

[54] RADIATION IMAGE INFORMATION READING APPARATUS

[75] Inventor: Tsutomu Kimura, Kanagawa, Japan

[73] Assignee: Fuji Photo Film Co., Ltd., Kanagawa, Japan

[21] Appl. No.: 869,948

[22] Filed: Apr. 17, 1992

[30] Foreign Application Priority Data

Apr. 19, 1991 [JP] Japan .................................. 3-088792

[51] Int. Cl.$^5$ ........................................... G01N 23/04
[52] U.S. Cl. ................................................. 250/580
[58] Field of Search ........................ 250/327.2, 484.1

[56] References Cited

U.S. PATENT DOCUMENTS

| 4,754,144 | 6/1988 | Seto | 250/327.2 |
| 4,829,180 | 5/1989 | Goto et al. | 250/327.2 F |
| 5,021,671 | 6/1991 | Kohda | 250/484.1 B |
| 5,061,852 | 10/1991 | Kawai | 250/484.1 B |
| 5,095,209 | 3/1992 | Tamura | 250/327.2 J |
| 5,099,119 | 3/1992 | Horikawa | 250/327.2 J |

FOREIGN PATENT DOCUMENTS

| 1086744 | 5/1986 | Japan | 250/327.2 H |
| 62-134557 | 12/1988 | Japan | |
| 256038 | 11/1991 | Japan | 250/327.2 H |

Primary Examiner—Carolyn E. Fields
Attorney, Agent, or Firm—Sughrue, Mion, Zinn, Macpeak & Seas

[57] ABSTRACT

Disclosed herein is a radiation image information reading apparatus for reading radiation image information recorded on a stimulable phosphor sheet and erasing the remaining radiation image information from the sheet. The apparatus generally includes a reading unit, an erasing unit, a light-intransmissive device, a first filter and a second filter. In the above apparatus, the sheet is first illuminated with stimulating rays to emit light therefrom, thereby photoelectrically reading the light to produce radiation image information. Erasing light is applied to the sheet from which the radiation image information has been read to erase remaining radiation image information as the sheet is read by the reading unit. The light-intransmissive device prevents the erasing light from entering into the reading unit.

6 Claims, 3 Drawing Sheets

RADIATION IMAGE INFORMATION READING APPARATUS

BACKGROUND OF THE INVENTION

1. Field of the Invention

The present invention relates to a radiation image information reading apparatus for reading radiation image information stored and recorded on a stimulable phosphor sheet and erasing the remaining radiation image information from the sheet.

2. Description of the Related Art

When a certain phosphor is exposed to a radiation, the phosphor stores the energy of the radiation. When the phosphor exposed to the radiation is subsequently exposed to exciting or stimulating rays such as visible light, etc., the phosphor emits accelerated light in proportion to the stored energy of the radiation. The phosphor exhibiting such a property is referred to as a "stimulable phosphor". The stimurable phosphor represented in the form of a sheet is used to record the radiation image information of an object such as a human body thereon and to produce the image information as a visible image. The radiation image information stored and recorded on the stimulable phosphor sheet (hereinafter called merely "sheet") is reproduced as the visible image on a recording medium such as a photographic photosensitive material or on a CRT or the like based on an image signal obtained by photoelectrically reading the accelerated light emitted from the sheet when the sheet is irradiated with the stimulating rays. Then, the sheet from which the radiation image information has been read is illuminated with erasing light emitted from an erasing light source such as a fluorescent lamp, a tungsten lamp or the like, thereby making it possible to erase the radiation image information from the sheet and reuse the sheet.

The apparatus for reading the radiation image information from the sheet on which the radiation image information has been recorded as described above, has generally been known. This type of apparatus normally comprises a cassette holding unit for detachably holding therein a cassette with the sheet stored therein in such a manner that it can be loaded therein and unloaded therefrom, a reading unit for reading the radiation image information in the above-described manner, and an erasing unit for erasing the radiation image information from the sheet after the reading of the radiation image information from the sheet has been completed. In the apparatus referred to above, the sheet, which is stored in the cassette held in the cassette holding unit, is first fed from the cassette to the reading unit, where the radiation image information is read. Thereafter, the sheet is fed to the erasing unit so as to erase the radiation image information therefrom, after which it is fed toward the cassette so as to load the sheet therein again.

In a radiation image information reading apparatus (see Japanese Patent Application Laid-Open No. 63-298333) which has been proposed by the present applicant, for example, an erasing unit is disposed in the course of a sheet feed path used to reciprocatively feed the sheet over the range from the inside of a cassette held in a cassette holding unit to the inside of a reading unit. Then, the sheet in the cassette is allowed to simply pass through the erasing unit along the sheet feed path in a manner as to be fed toward the reading unit. At this time, radiation image information is read from the sheet while the sheet is being fed into the reading unit. After the reading of the radiation image information from the sheet has been completed, the sheet is reversely fed toward the cassette from the reading unit along the sheet feed path so as to be returned to the inside of the cassette. At this time, the radiation image information is erased from the sheet while the sheet delivered from the reading unit is being fed in the erasing unit. In the radiation image information reading apparatus referred to above, the erasing unit is provided between the cassette holding unit and the reading unit. Then, the sheet from which the radiation image information has been read, is reversely fed toward the cassette from the reading unit in order to return the sheet to the cassette. Under this condition, the radiation image information is erased from the sheet. It is therefore possible to prevent the entire structure of the radiation image information reading apparatus from becoming large in size owing to the provision of the erasing unit.

In this type of radiation image information reading apparatus, however, the radiation image information is erased from the sheet after the reading of the radiation image information recorded on the sheet has fully been completed. Thus, the reading of the radiation image information from the sheet and the erasing of the same therefrom are independently carried out. Therefore, a time interval required to read the radiation image information from the sheet and a time interval required to erase it therefrom make a relatively long period of time in total. Accordingly, a long period of time is required until the sheet is enabled to be reused, so that the entire process for reading the radiation image information from the sheet cannot efficiently be carried out.

SUMMARY OF THE INVENTION

It is a general object of the present invention to provide a radiation image information reading apparatus capable of efficiently and shortly reading radiation image information stored and recorded on a stimulable phosphor sheet and erasing it from the sheet, and highly accurately carrying out a process for reading the radiation image information from the sheet in particular.

It is another object of the present invention to provide a radiation image information reading apparatus having a reading unit for irradiating a stimulable phosphor sheet with a stimulating ray so as to emit accelerated light from the stimulable phosphor sheet, thereby photoelectrically reading the light to produce radiation image information, and an erasing unit disposed between the reading unit and a cassette holding unit, for irradiating the sheet from which the radiation image information has been read with erasing light thereby to erase the remaining radiation image information from the sheet, which comprises light-intransmissive means disposed between the reading unit and the erasing unit, for preventing the erasing light from leaking in the reading unit, a first filter disposed in the reading unit, for allowing the accelerated light to pass therethrough and preventing light having at least a wavelength longer than that of the stimulating ray from passing therethrough, and a second filter disposed in the erasing unit, for allowing the erasing light to pass therethrough and preventing light having at least a wavelength shorter than that of the transmitted light of the first filter in the reading unit from passing therethrough.

It is a further object of the present invention to provide a radiation image information reading apparatus wherein the light-intransmissive means comprises a light-intransmissive plate having a slit defined therethrough for enabling the sheet to be inserted therein, and a light-intransmissive roller brought into abutment against at least one face of the sheet.

It is a still further object of the present invention to provide a radiation image information reading apparatus wherein the first filter is mounted on a photomultiplier serving as photoelectric reading means.

It is a still further object of the present invention to provide a radiation image information reading apparatus wherein the second filter is mounted on a reflecting plate for enclosing an erasing light source of the erasing unit.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
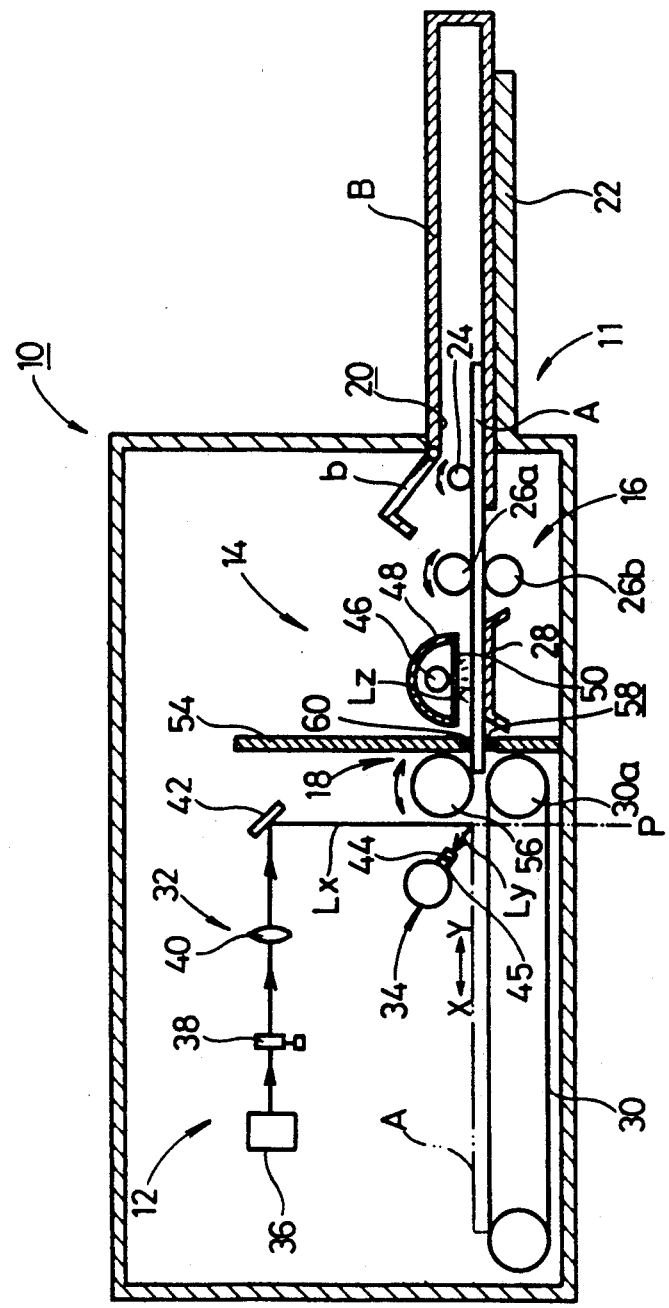
FIG. 1 is schematic view showing a radiation image information reading apparatus according to one embodiment of the present invention.

In FIG. 1, reference numeral 10 indicates a radiation image information reading apparatus according to one embodiment of the present invention. The radiation image information reading apparatus 10 comprises a cassette holding unit 11 for detachably holding therein a cassette B with a stimulable phosphor sheet A (hereinafter called merely a "sheet A") stored therein in a manner as to be freely inserted therein and discharged therefrom, a reading unit 12 for reading radiation image information (hereinafter called merely "image information") stored and recorded on the sheet A, an erasing unit 14 for erasing the image information from the sheet A, a sheet feed means 16 for feeding the sheet A into the reading unit 12 from the cassette B held in the cassette holding unit 11 (i.e., feeding it in the direction indicated by the arrow X) and loading the sheet A in the cassette B from the reading unit 12 through the erasing unit 14 (i.e., feeding it in the direction indicated by the arrow Y), and a light-intransmissive means 18 disposed between the reading unit 12 and the erasing unit 14, for preventing erasing light from leaking into the reading unit 12.

The cassette holding unit 11 has an aperture or opening 20 for allowing one end of the cassette B to which an opening and closing cover b is attached to be fitted and inserted therein, and a support plate 22 for detachably supporting the cassette B thereon in a horizontal posture. The cassette holding unit 11 is constructed in such a manner that the opening and closing cover b of the cassette B is opened by an unillustrated opening and closing mechanism when the one end of the cassette B is fitted and inserted in the opening 20.

The sheet feed means 16 comprises a sheet loading-/unloading roller 24 disposed near the opening 20 of the cassette holding unit 11, a pair of feed rollers 26a, 26b vertically provided side by side between the roller 24 and the erasing unit 14, a guide plate 28 disposed in the erasing unit 14, and a feed conveyer 30 disposed in the reading unit 12. When the cassette B with the sheet A stored therein is held in the cassette holding unit 11 as described above, the roller 24 is inserted into the one end of the cassette B as shown in FIG. 1 so that the lower surface of the roller 24 is brought into abutment against the upper surface of the sheet A.

The reading unit 12 includes a stimulating-rays applying means 32 for applying exciting or stimulating rays Lx such as a laser beam, etc. to the sheet A when the sheet A is fed in a reverse direction (i.e., in the direction indicated by the arrow Y), and a photomultiplier 34 as a photoelectric reading means for photoelectrically reading image information stored and recorded on the sheet A based on accelerated light Ly emitted from the sheet A upon exposure of the stimulating rays Lx to the sheet A.

The stimulating-rays applying means 32 comprises a light source 36 such as a laser beam source, and a mirror 42 for exposing the stimulating rays Lx of the light source 36 focused thereon by a light deflector 38 such as a galvanometer mirror and a scanning lens 40 in that order to the sheet A fed in the reverse direction along the feed conveyor 30. The mirror 42 serves to apply the stimulating rays Lx to the sheet A in a given irradiating position P.

The photomultiplier 34 has a light guide device 44 which projects toward the irradiating position P from a light-receiving surface thereof. When the sheet A with the image information recorded thereon is irradiated with the stimulating rays Lx in the irradiating position P, the photomultiplier 34 receives the accelerated light Ly emitted from the sheet A via the light guide device 44 and photoelectrically reads as a signal the image information recorded on the sheet A from the received accelerated light. Then, the photomultiplier 34 converts the read image information signal into an electric image signal and outputs it to an external device (not shown). The photomultiplier 34 has a first filter 45, to be described later mounted thereon for causing the accelerated light Ly to pass therethrough and preventing light having at least a wavelength longer than that of each of the stimulating rays Lx from passing therethrough. The erasing unit 14 comprises an erasing light source 46 such as a fluorescent lamp, a tungsten lamp or the like, for applying erasing light Lz to the sheet A, a semicircular reflecting plate 48 disposed above the erasing light source 46, and a second filter 50 to be described later, for causing the erasing light Lz to pass therethrough and preventing light having at least a wavelength shorter than that of the transmitted light of the first filter 45 in the reading unit 12 from passing therethrough.

As shown in FIG. 1, the light-intransmissive means 18 includes a light-intransmissive plate 54 provided upright between the reading unit 12 and the erasing unit 14, and a light-intransmissive roller 56 disposed above a rotatable roller 30a of the feed conveyor 30 on the erasing unit 14 side. The light-intransmissive plate 54 has a slit 58 defined therethrough, for enabling the sheet A to freely pass therethrough when the sheet A is fed between the reading unit 12 and the erasing unit 14 by the sheet feed means 16. Tufted-fabric members 60 such as a Teremp (plush), etc., which are brought into sliding contact with the upper and lower surfaces of the sheet A over the transversely-extending overall lengths of the upper and lower surfaces of the sheet A, are implanted in opposed inner surfaces of the slit 58. The light-intransmissive roller 56 and the rotatable roller 30a of the feed conveyor 30 are respectively brought into abutment against the upper and lower surfaces of the sheet A which travels along the feed conveyor 30 while they are being rotated over the transversely-extending overall lengths of the upper and lower surfaces of the sheet A.

Figure 2:
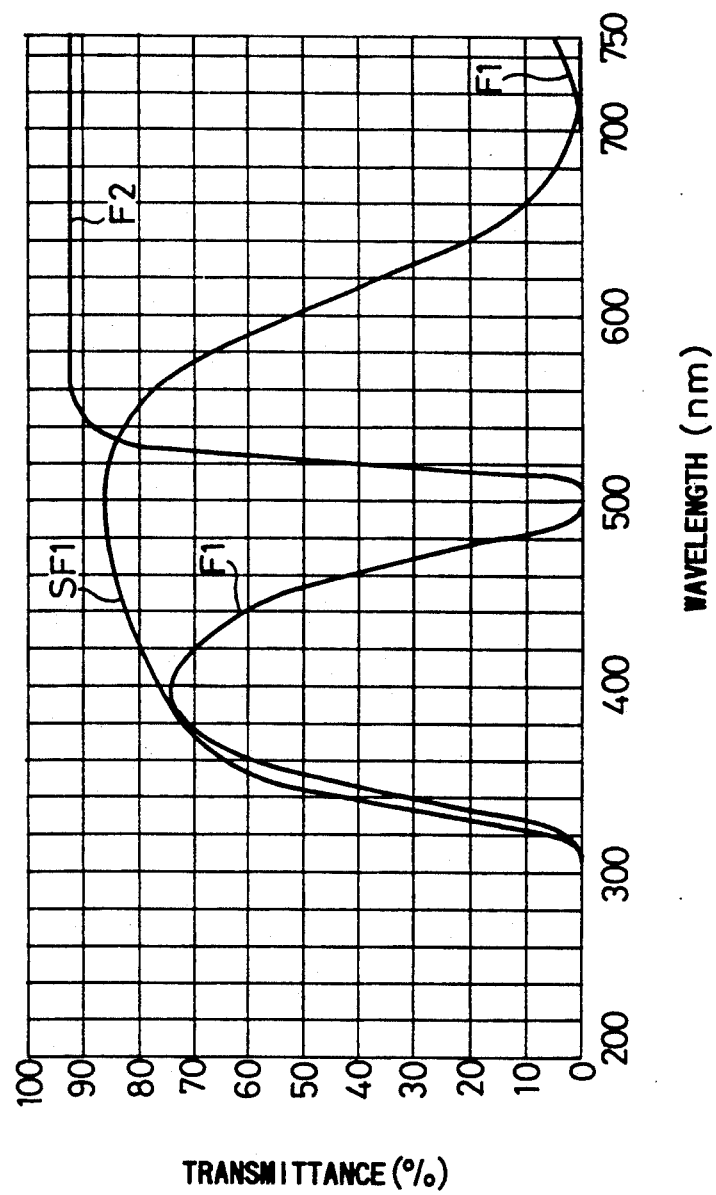
FIG. 2 is a view showing transmissive characteristics of filters employed in the radiation image information reading apparatus.

A specific description will now be made of the first filter 45 attached to the photomultiplier 34, for causing the accelerated light Ly to pass therethrough and preventing the light having at least the wavelength longer than that of each of the stimulating rays Lx from passing therethrough, and the second filter 50 disposed in the erasing unit 14, for causing the erasing light Lz to pass therethrough and preventing the light shorter than that of the transmitted light of the first filter 45 in the reading unit 12 where a stimulable phosphor sheet using a BaFX:Eu phosphor (X: one) halogen element of Cl, Br, and I) is used as the stimulable phosphor sheet. The wavelength of light Ly emitted from the BaFX:Eu phosphor is about 400 nm, whereas the wavelength of a stimulating ray Lx is about 600 nm. Thus, as shown in FIG. 2, a filter F1 (B-390 color filter produced by HOYA in the present embodiment) capable of preventing light having a wavelength of about 500 nm or longer from passing therethrough is used as the first filter 45. However, the filter F1 allows light having a wavelength of about 720 nm or longer to pass therethrough. The combined use of the filter F1 and a subfilter SF1 shown in FIG. 2 can provide a desired transmissive characteristic. In addition, a filter F2 having a transmissive characteristic which is capable of preventing light having a wavelength of about 500 nm or less from passing therethrough, is used as the second filter 50.

Figure 3:
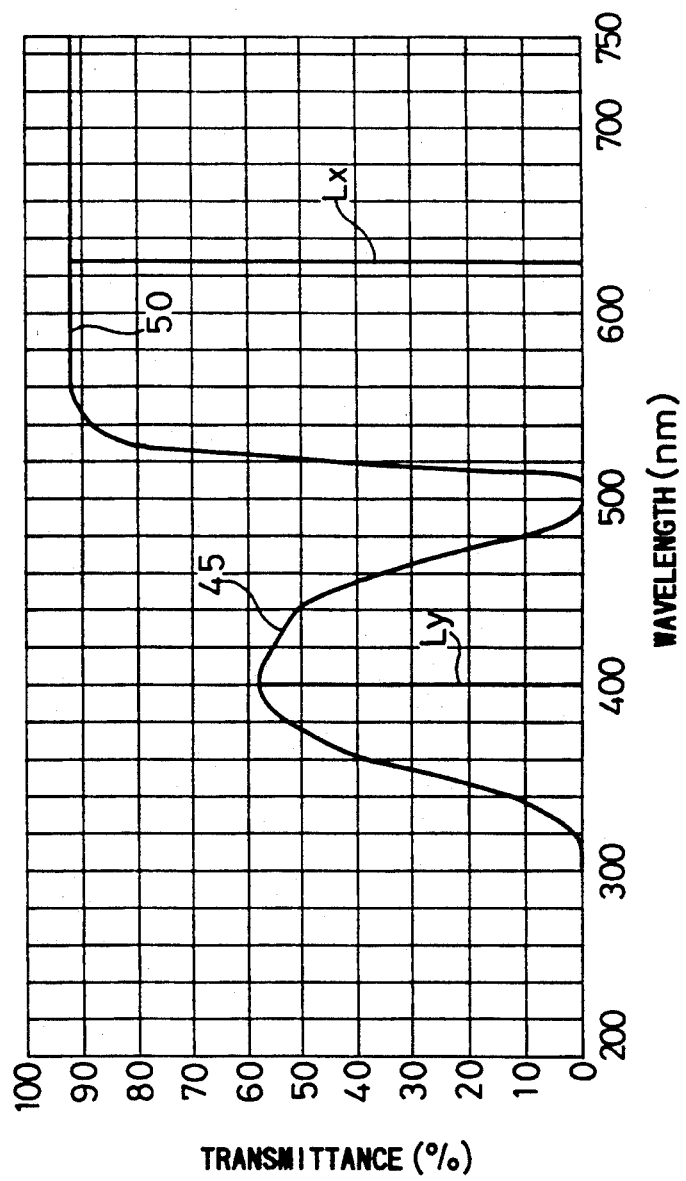
FIG. 3 is a view for describing the relationship among transmissive characteristics of respective filters employed in a reading unit and an erasing unit of the apparatus, accelerated light and a stimulating ray.

FIG. 3 is a view for describing the relationship among transmissive characteristics of the first filter 45 using the filter F1 and the subfilter SF1 and the second filter 50 using the filter F2 (Y-44 color filter produced by HOYA in the present embodiment), the accelerated light Ly and the stimulating ray Lx.

The operation of the radiation image information reading apparatus 10 will now be described below.

When image information is read from the sheet A on which the image information of an object such as a human body has been recorded and which has been held in the cassette B, the cassette B is first horizontally held in the cassette holding unit 11. Then, the radiation image information reading apparatus 10 is activated in this condition. Therefore, the sheet A loaded in the cassette B is unloaded from the cassette B by the sheet feed means 16. Further, the sheet A passes through the erasing unit 14 and the light-intransmissive means 18 in that order so as to be fed in the direction indicated by the arrow X, followed by transfer to the reading unit 12. At this time, the erasing light source 46 in the erasing unit 14 is deenergized, so that the sheet A simply passes through the erasing unit 14 and is moved into the reading unit 12 until one end of the sheet A on the cassette B side reaches the irradiating position P.

Then, the sheet feed means 16 is activated to cause the sheet A to be fed toward the cassette holding unit 11 along the direction (i.e., the direction indicated by the arrow Y) opposite to the above direction via the light-intransmissive means 18 and the erasing unit 14, thereby enabling the sheet A to be re-loaded in the cassette B held in the cassette holding unit 11.

At this time, the sheet A is irradiated in the irradiating position P with the stimulating rays Lx from the stimulating-rays applying means 32 when the sheet A is introduced into the erasing unit 14 from the reading unit 12 via the light-intransmissive means 18. This irradiation is successively made over the range of the one end of the sheet A on the cassette B side to the other end thereof as the sheet A is gradually fed toward the cassette holding unit 11. When the sheet A illuminated with the stimulating rays Lx, the accelerated light Ly is emitted from the sheet A according to the image information thereof. Further, the photomultiplier 34 successively reads the image information from the accelerated light Ly emitted from the sheet A over the range of the one end of the sheet A on the cassette B side to the other end thereof as the sheet A is fed in the reverse direction.

In this case, the first filter 45 having the transmissive characteristic shown in FIG. 3 by way of example is disposed between the photomultiplier 34 and the light guide device 44. Therefore, the stimulating rays Lx having the wavelength of about 600 nm are rendered intransmissive, and the accelerated light Ly having the wavelength of about 400 nm, which is emitted from the sheet A, passes through the first filter 45 so as to reach the photomultiplier 34. Accordingly, the photomultiplier 34 can photoelectrically convert only a light signal associated with image information into an appropriate image signal.

On the other hand, the erasing light source 46 is energized upon reading of the image information. Thus, the erasing light Lz emitted from the erasing light source 46 is successively applied to the sheet A over the range of the one end thereof to the other end thereof as the sheet A having the range of the one end thereof to the other end thereof from which the image information has already been read is discharged from the reading unit 12 and then fed toward the cassette B from the erasing unit 14 along the reverse direction. As a result, the radiation image information which remains on the sheet A is gradually erased.

Accordingly, the erasing of the image information from the sheet A is carried out in parallel with the reading of the image information therefrom. The remaining image information is successively erased from the one end of the sheet A from which the image information has been read to the other end thereof from which it has been read. In this case, the erasing light Lz emitted from the erasing light source 46 is prevented from flowing into the reading unit 12 by using the light-intransmissive means 18. Therefore, a portion of the sheet A, which remains in the reading unit 12, is no longer illuminated with the erasing light Lz. It is thus possible to prevent the image information on the sheet A during the reading or before the reading from being erased by the erasing light Lz. The second filter 50 having the transmittance characteristic shown in FIG. 3 is disposed in front of the erasing light source 46. Therefore, erasing light Lz having wavelengths including a wavelength of about 500 nm or shorter and the wavelength of the accelerated light Ly emitted from the sheet A is cut off or blocked by the second filter 50, whereas erasing light Lz having wavelengths including a wavelength of 500 nm or longer and a wavelength of erasing light required to erase the image information on the sheet A reaches the sheet A. Thus, even if the erasing light leaks through the reading unit 12, the erasing light Lz is blocked by the first filter 45, thereby making it possible to suitably erase the image information without exerting an effect on the image reading.

Then, when the sheet A passes through the erasing unit 14 and is returned to the cassette B, the image information is completely erased from the sheet A. Thus, the sheet A can be used again by taking out the cassette B with the sheet A re-loaded therein from the cassette holding unit 11.

In the present embodiment, if light having a wavelength of 720 nm or longer is not included in the erasing light Lz emitted from the erasing light source 46, then the subfilter SF1 may not be used.

Further, in the present embodiment, the image information recorded on the sheet A is successively read over the range of the one end of the sheet A to the other end thereof. The remaining image information can successively be erased in parallel with the image reading process from the whole region on the sheet A from which the image information has been read. The reading of the image information from the sheet A and the erasing of the remaining image information therefrom can efficiently be carried out in a short period of time at a time.

The radiation image information reading apparatus according to the present invention can bring about the following advantageous effects.

A stimulable phosphor sheet with radiation image information recorded thereon is first introduced into a reading unit. Thereafter, the sheet is irradiated with stimulating rays while it is being reversely fed via an erasing unit toward a cassette from the reading unit so as to produce accelerated light, thereby photoelectrically reading the radiation image information from the produced light. Then, erasing light is continuously applied to the range of one end of the sheet to the other end thereof from which the radiation image information has already been read, thereby enabling the remaining radiation image information to be erased. At this time, a light-intransmissive means serves to block or cut off the erasing light from leaking in the reading unit. In particular, unnecessary light can reliably be prevented from being incident to the reading unit by a first filter disposed in the reading unit and a second filter disposed in the erasing unit. As a result, electric noise is not produced in the electrically read radiation image information, and a process for reading the radiation image information can highly accurately be carried out. In addition, a process for reading the radiation image information stored and recorded on the stimulable phosphor sheet and a process for erasing the remaining radiation image information from the sheet can continuously be carried out in a short period of time, thereby making it possible to efficiently and easily carry out the entire radiation image information reading process.

Having now fully described the invention, it will be apparent to those skilled in the art that many changes and modifications can be made without departing from the spirit or scope of the invention as set forth herein.

What is claimed is:

1. A radiation image information reading apparatus comprising:
    a reading unit for irradiating a stimulable phosphor sheet with a stimulating ray so as to emit accelerated light from said sheet, said accelerated light being read to produce radiation image information;
    an erasing unit for irradiating said sheet, as said radiation image information is read by said reading unit, with erasing light to thereby erase remaining radiation image information from said sheet;
    a cassette holding unit, said erasing unit being disposed between said cassette holding unit and said reading unit;
    light-intransmissive means disposed between said reading unit and said erasing unit, for preventing the erasing light from leaking in said reading unit, wherein said reading unit and said erasing unit are positioned adjacent to said sheet;
    a first filter disposed in said reading unit, for allowing said accelerated light to pass therethrough and preventing light having at least a wavelength longer than that of said stimulating ray from passing therethrough; and
    a second filter disposed in said erasing unit, for allowing said erasing light to pass therethrough and for preventing light having at least a wavelength shorter than that of the transmitted light of said first filter in said reading unit form passing therethrough.

2. A radiation image information reading apparatus according to claim 1, wherein said light-intransmissive means comprises:
    a light-intransmissive plate having a slit through which said sheet passes; and
    a light-intransmissive roller brought into abutment against at least one face of said sheet.

3. A radiation image information reading apparatus according to claim 1, wherein said reading means comprises a photomultiplier for photoelectrically reading said accelerated light, and said first filter is mounted on said photomultiplier.

4. A radiation image information reading apparatus according to claim 1, wherein said erasing unit comprises an erasing light source and a reflecting plate surrounding said erasing light source, and said second filter is mounted on said reflecting plate.

5. A radiation image information reading apparatus according to claim 2, wherein said erasing unit comprises an erasing light source and a reflecting plate surrounding said erasing light source, and said second filter is mounted on said reflecting plate.

6. A radiation image information reading apparatus according to claim 3, wherein said erasing unit comprises an erasing light source and a reflecting plate surrounding said erasing light source, and said second filter is mounted on said reflecting plate.

* * * * *